United States Patent
Ezrielev et al.

(10) Patent No.: US 12,235,999 B2
(45) Date of Patent: Feb. 25, 2025

(54) SYSTEM AND METHOD FOR REMEDIATING POISONED TRAINING DATA USED TO TRAIN ARTIFICIAL INTELLIGENCE MODELS

(71) Applicant: Dell Products L.P., Round Rock, TX (US)

(72) Inventors: Ofir Ezrielev, Be'er Sheva (IL); Amihai Savir, Newton, MA (US); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 321 days.

(21) Appl. No.: 18/147,752

(22) Filed: Dec. 29, 2022

(65) Prior Publication Data
US 2024/0220661 A1    Jul. 4, 2024

(51) Int. Cl.
*G06F 21/64* (2013.01)
*G06F 21/57* (2013.01)

(52) U.S. Cl.
CPC .............. *G06F 21/64* (2013.01); *G06F 21/57* (2013.01)

(58) Field of Classification Search
CPC ................................ G06F 21/57; G06F 21/64
USPC .......................................................... 726/26
See application file for complete search history.

(56) References Cited

U.S. PATENT DOCUMENTS

| | | |
|---|---|---|
| 10,936,969 B2 | 3/2021 | Patel et al. |
| 11,636,726 B2 | 4/2023 | Purohit |
| 11,785,024 B2 | 10/2023 | Karam |
| 11,797,672 B1 * | 10/2023 | Beveridge ............. G06F 21/554 |
| 11,847,217 B2 | 12/2023 | Healy |
| 11,921,903 B1 * | 3/2024 | Beveridge ............. G06F 21/577 |
| 12,032,541 B2 | 7/2024 | Hasabnis |

(Continued)

FOREIGN PATENT DOCUMENTS

| | | |
|---|---|---|
| WO | 2022/216142 A1 | 10/2022 |
| WO | 2023/111287 A1 | 6/2023 |

OTHER PUBLICATIONS

Anastasovski, Goce, "Classification of Malicious Web Traffic" (2013), Graduate Theses, Dissertations, and Problem Reports 153 (118 Pages).

(Continued)

*Primary Examiner* — Michael S McNally
(74) *Attorney, Agent, or Firm* — Womble Bond Dickinson (US) LLP

(57) ABSTRACT

Methods and systems for managing artificial intelligence (AI) models are disclosed. To manage AI models, poisoned training data introduced into an instance of the AI models may be identified and the impact of the poisoned training data on the AI models may be efficiently mitigated. To do so, a first poisoned AI model instance may be obtained. Rather than re-training an un-poisoned AI model instance to remove the impact of poisoned training data, the first poisoned AI model instance may be selectively un-trained whenever poisoned training data is found in the training dataset. Subsequently, weights of the first poisoned AI model instance may be adjusted to account for future training data. As poisoned training data may occur infrequently, selectively un-training the AI model may conserve computing resources and minimize AI model downtime when compared to a full or partial re-training process of an un-poisoned AI model instance.

20 Claims, 8 Drawing Sheets

(56) References Cited

U.S. PATENT DOCUMENTS

| | | | |
|---|---|---|---|
| 12,126,640 | B2 | 10/2024 | Woodworth |
| 12,143,405 | B2 | 11/2024 | Chen Kaidi |
| 2017/0177860 | A1 | 6/2017 | Suarez |
| 2018/0255023 | A1 | 9/2018 | Whaley |
| 2019/0377873 | A1 | 12/2019 | Murphy |
| 2020/0050945 | A1 | 2/2020 | Chen |
| 2020/0082097 | A1 | 3/2020 | Poliakov |
| 2020/0082270 | A1 | 3/2020 | Gu |
| 2021/0073685 | A1 | 3/2021 | Veshchikov |
| 2021/0081831 | A1 | 3/2021 | Angel |
| 2021/0398020 | A1 | 12/2021 | Ahmad et al. |
| 2022/0179840 | A1 | 6/2022 | Chatterjee |
| 2022/0414492 | A1 | 12/2022 | Jezewski |
| 2023/0079112 | A1 | 3/2023 | Cheruvu |
| 2023/0164162 | A1 | 5/2023 | Lee |
| 2023/0274003 | A1 | 8/2023 | Liu |
| 2023/0274192 | A1* | 8/2023 | Wang .............. G06N 20/00 706/12 |
| 2024/0015019 | A1 | 1/2024 | Sneider |
| 2024/0119153 | A1 | 4/2024 | Ludmir |
| 2024/0364534 | A1 | 10/2024 | Ezrielev |

OTHER PUBLICATIONS

Joshi, Naveen, "Is The Data Used for Training Your Machine Learning Model Safe?", Technology for You, Jul. 28, 2022, <https://www.technologyforyou.org/is-the-data-used-for-training-your-machine-learning-model-safe/> (3 Pages).

Wang, Siruo et al., "Methods for correcting inference based on outcomes predicted by machine learning." Proceedings of the National Academy of Sciences 117.48 (2020): 30266-30275. (10 Pages).

Rauschmayr, Nathalie et al., "Detecting and analyzing incorrect model predictions with Amazon SageMaker Model Monitor and Debugger", AWS Machine Learning Blog, Jul. 9, 2020, <https://aws.amazon.com/blogs/machine-learning/detecting-and-analyzing-incorrect-model-predictions-with-amazon-sagemaker-model-monitor-and-d%E2%80%A6/> (13 Pages).

Higgins, Kelly Jackson, "Honeypot Stings Attackers With Counterattacks", Dark Reading, Mar. 26, 2013, <https://www.darkreading.com/vulnerabilities-threats/honeypot-stings-attackers-with-counterattacks> (4 Pages).

Susmelj, Igor, "The Data You Don't Need: Removing Redundant Samples", Towards Data Science, Mar. 19, 2020, https://towardsdatascience.com/the-data-you-don-t-need-removing-redundant-samples-6bfd07c1516c> (10 Pages).

* cited by examiner

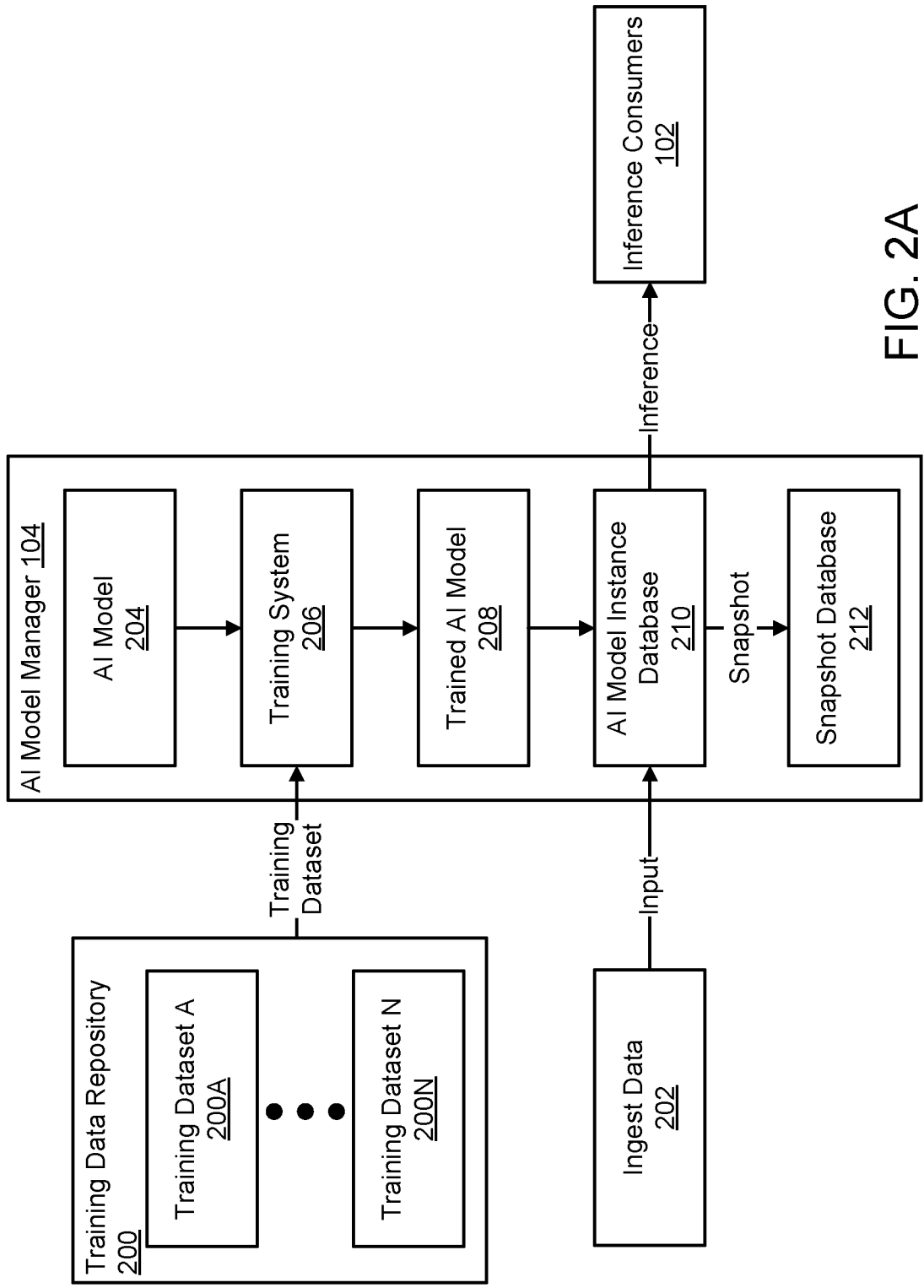

SYSTEM AND METHOD FOR REMEDIATING POISONED TRAINING DATA USED TO TRAIN ARTIFICIAL INTELLIGENCE MODELS

FIELD

Embodiments disclosed herein relate generally to artificial intelligence (AI) models. More particularly, embodiments disclosed herein relate to systems and methods to manage instances of AI models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2A shows a data flow diagram illustrating an AI model management system in accordance with an embodiment.

DETAILED DESCRIPTION

Figure 1:
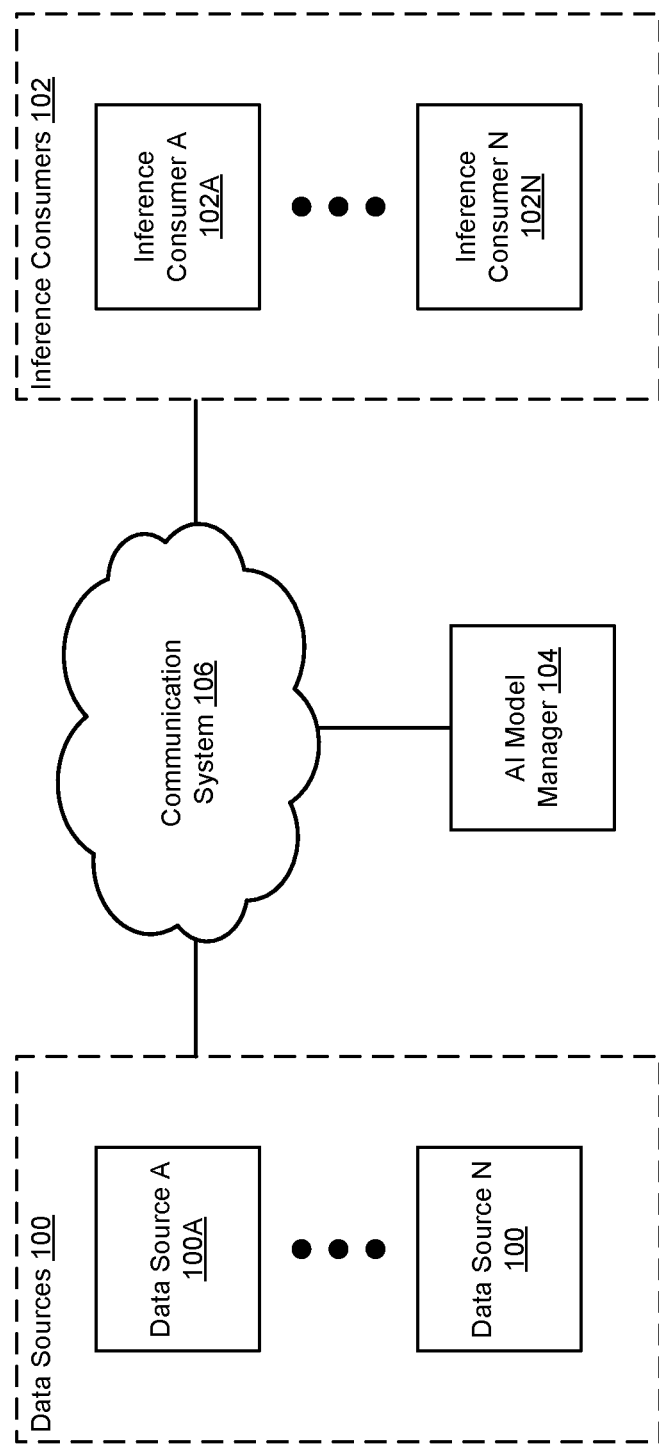
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing AI models. Trained AI models may provide computer-implemented services (e.g., inference generation) for downstream consumers (e.g., inference consumers). To manage trained AI models, a data processing system may, over time, update AI models through training using training data. However, if poisoned training data is introduced to the AI model, the AI model may become untrustworthy (e.g., the AI model may be tainted by the poisoned training data). Inferences generated using the tainted (e.g., poisoned) AI model may also be untrustworthy or inaccurate.

Once it has been discovered that an AI model has been tainted (e.g., poisoned) with poisoned training data, the model may require re-training to remove the influence of the poisoned training data, and any or all inferences generated using the tainted (e.g., poisoned) AI model may be untrustworthy. Training an AI model may be a computationally expensive process and may require the use of a limited amount of computing resources that may otherwise be used for inference generation. In other words, computing resources spent re-training AI models may interrupt inference consumption and/or other types of computer-implemented services that may otherwise be provided using the computing resources dedicated to re-training.

Once the AI model is retrained, any and/or all inferences provided to inference consumers using the tainted AI model may require replacement. Inference generation may be required for an entire ingest dataset, prompting another inefficient use of computing resources.

To reduce computing resources spent re-training AI models, an AI model snapshot may be obtained periodically throughout the AI model training process. The snapshot may store information regarding the structure of the AI model, which may be used to restore a partially trained untainted AI model. The restored AI model may require training using only a subset of the original training dataset, thereby requiring fewer computational resources than re-training an AI model from scratch using the entire training dataset. Thus, reverting to a last known good AI model may require less resource expenditure than re-training an AI model from scratch.

However, the process of reverting to a last known good AI model and re-training the AI model with all available un-poisoned training data may still consume an undesirable quantity of computing resources and/or may increase downtime of the AI model (e.g., time when the AI model is not generating inferences) to an extent considered unacceptable by the inference consumer. In addition, the increase in inference accuracy achieved through re-training the AI model may not be significant enough to justify the AI model downtime resulting from the re-training process (due to, for example, infrequent occurrences of poisoned training data in the larger training dataset).

To decrease downtime associated with remediation of poisoned training data while conserving computational resources, the system may perform an un-training process on the first poisoned instance of the AI model rather than reverting to an un-poisoned instance of the AI model and re-training using un-poisoned training data. The un-training process may include: (i) reverting to a first poisoned instance of the AI model, (ii) remediating an impact of poisoned training data on the first poisoned instance of the AI model to obtain a first new AI model, (iii) obtaining a difference between weights associated with the first new AI model and weights associated with a second poisoned instance of the AI model (obtained via further training of the first poisoned instance of the AI model), (iv) adding the difference to the weights associated with the first new AI model to obtain a second new AI model, and/or (v) repeating this process with each subsequent instance (e.g., instances generated through further training of the second poisoned instance of the AI model) as needed to reduce the impact of all poisoned training data. Remediating the impact of the poisoned training data may be achieved through (i) the introduction of contradictory data (e.g., data with values contradicting values in the poisoned training data) to the AI model, (ii) performing a gradient ascent process, and/or (iii) via other methods.

By doing so, embodiments disclosed herein may provide a system for managing AI models in which the impact of poisoned training data may be computationally efficiently mitigated. By performing an un-training process on a poisoned AI model instance and manually updating the AI model by modifying the weights, the AI model may be efficiently updated to reflect the most recent un-poisoned training data. Consequently, the computational resources and downtime typically associated with re-training a tainted AI model may be reduced, leaving more computational resources and time for inference generation.

In an embodiment, a method for managing an artificial intelligence (AI) model is provided. The method may include: obtaining a snapshot of a first poisoned instance of the AI model, the first poisoned instance of the AI model being obtained using, at least in part, first poisoned training data; remediating an impact of the first poisoned training data on the first poisoned instance of the AI model to obtain a first new AI model; obtaining a snapshot of the first new AI model; obtaining a snapshot of a second poisoned instance of the AI model, the second poisoned instance of the AI model being obtained through further training of the first poisoned instance of the AI model; obtaining first weights associated with the new AI model using the snapshot of the new AI model; obtaining second weights associated with the second poisoned instance of the AI model using the snapshot of the second poisoned instance of the AI model; obtaining a first difference using the first weights and the second weights; and obtaining a second new AI model using the first weights and the first difference.

The method may also include: making a determination regarding whether the second poisoned instance of the AI model was trained using, at least in part, second poisoned training data; and in a first instance of the determination in which the second poisoned instance of the AI model was trained using, at least in part, second poisoned training data: remediating an impact of the second poisoned training data on the second new AI model to obtain a third new AI model, the third new AI model being treated as a replacement for the second poisoned instance of the AI model; and in a second instance of the determination in which the second poisoned instance of the AI model was not trained using, at least in part, second poisoned training data: treating the second new AI model as the third new AI model.

The method may also include: obtaining a snapshot of the third poisoned instance of the AI model, the third poisoned instance of the AI model being obtained through further training of the second poisoned instance of the AI model using, at least in part, third poisoned training data; obtaining a snapshot of the third new AI model; obtaining third weights associated with the third poisoned instance of the AI model using the snapshot of the third poisoned instance of the AI model; obtaining fourth weights associated with the third new AI model using the snapshot of the third new AI model; obtaining a second difference using the third weights and the fourth weights; obtaining a fourth new AI model using the fourth weights and the second difference; and remediating an impact of the third poisoned training data on the fourth new AI model to obtain a fifth new AI model, the fifth new AI model being treated as a replacement for the third poisoned instance of the AI model.

The method may also include: obtaining a snapshot of a third poisoned instance of the AI model, the third poisoned instance of the AI model being obtained through further training of the second poisoned instance of the AI model using, at least in part, additional un-poisoned training data; obtaining a snapshot of the third new AI model; obtaining third weights associated with the third poisoned instance of the AI model using the snapshot of the third poisoned instance of the AI model; obtaining fourth weights associated with the third new AI model using the snapshot of the third new AI model; obtaining a second difference using the third weights and the fourth weights; obtaining a fourth new AI model using the fourth weights and the second difference, the fourth new AI model being treated as a replacement for the third poisoned instance of the AI model.

The first poisoned instance of the AI model may also be obtained, at least in part, using additional un-poisoned training data.

Obtaining the first weights may include: obtaining the snapshot of the first new AI model; obtaining structural information of the first new AI model; and obtaining the first weights from the snapshot of the first new AI model using the structural information of the first new AI model.

Obtaining the first difference may include: identifying a first weight of the first weights; identifying a first weight of the second weights that corresponds to the first weight of the first weights; and obtaining a difference between the first weight of the first weights and the first weight of the second weights to obtain a portion of the first difference.

Remediating the impact of the first poisoned training data on the first poisoned instance of the AI model may include: performing an un-training process on the first poisoned instance of the AI model to obtain the first new AI model using the first poisoned training data.

Performing the un-training process may include: obtaining contradictory training data, the contradictory training data including data values contradicting poisoned data values in the first poisoned training data; and further training the first poisoned instance of the AI model using the contradictory training data.

Performing the un-training process may include: further training the first poisoned instance of the AI model using the first poisoned training data and an optimization process that modifies weights of the first poisoned instance of the AI model with an objective of poorly predicting the first poisoned training data, wherein the first poisoned instance of the AI model having been obtained through further training of an un-poisoned instance of the AI model using, at least in part, the poisoned training data and an objective of faithfully predicting the first poisoned training data.

The further training of the first poisoned instance of the AI model may include: performing a gradient ascent process to increase a loss function of the first poisoned instance of the AI model.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, deep neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences.

To obtain AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104). However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI model may be obtained. The new versions of the AI models may be obtained, for example, due to requests from inference consumers 102, acquisition of additional training data that may improve the accuracy of inferences provided by the AI models, and/or for other reasons.

To obtain the AI models, existing AI models may be used as a basis for new AI models thereby leveraging the existing resource expenditures used to obtain the existing AI models. For example, updating instances of the AI models may be obtained through training as more training data is obtained (e.g., incremental learning).

Training of AI models may be computationally costly because training may require significant resource expenditures. However, the introduction of malicious or poisoned training data can in turn, poison the new AI model instance, any inferences obtained from the poisoned AI model instance, and further poison other AI model instances derived from the new AI model instance.

In general, embodiments disclosed herein may provide methods, systems, and/or devices for managing AI models. The AI models may be managed in a manner that allows for the impact of poisoned training data to be identified and remediated in a computationally efficient manner. By doing so, the system may be more likely to be able to provide desired computer-implemented services due to improved access to computing resources.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated, (vii) generate snapshots for the AI model as it is updated over time, and/or (viii) remediate the impact of poisoned training data on the AI model.

In order to obtain a trained AI model instance, AI model manager 104 may obtain an AI model and a training dataset. The training dataset may be obtained through multiple data sources 100. Data sources 100 may include any number of data sources (e.g., 100A, 100N). For example, an AI model may be used for facial recognition; that is, identifying a person from an image or video. In this example, the AI model may be a deep learning model type and data sources may include multiple social media platforms. A training dataset may be created by collecting images or video of a person who has already been identified by a user. The training dataset may then be used to train an instance of the AI model.

Further, in order to obtain an inference from the trained AI model instance, other data may be collected from the same data sources 100 or another data source. Continuing with the above example, another data source 100 may be a security camera. The ingest dataset may include images or video of the same person not identified by a user. An inference (e.g., an identification of the person) may be obtained from the trained instance of the AI model after ingesting the ingest dataset, and the inference may be distributed to inference consumers 102.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot). Using incremental snapshots may improve efficiency as they may use fewer computing resources (e.g., data transfer and/or data storage) than a full snapshot. Generating snapshots of the AI model over time may allow for the impact of poisoned data to be computationally efficiently mitigated.

To remediate the impact of poisoned data, AI model manager 104 may obtain a poisoned data notification. When a poisoned data notification is identified, AI model manager may use the snapshots to (i) revert an existing AI model instance to a first poisoned instance of the AI model (e.g., a previous AI model instance that is tainted by the poisoned training data), (ii) obtain a difference between weights associated with the first poisoned instance of the AI model and weights associated with a second poisoned instance of the AI model (e.g., an instance of the AI model obtained through further training of the first poisoned instance of the AI model), (iii) add the difference to the weights associated with the first new AI model to obtain a second new AI model, and/or (iv) repeat steps ii-iii with each subsequent instance (e.g., instances generated through further training of the second poisoned instance of the AI model) as needed to update the AI model while reducing the impact of all poisoned training data. Remediating the impact of the poisoned training data may be achieved through (i) the introduction of contradictory data (e.g., data with values contradicting values in the poisoned training data) to the AI model, (ii) performing a gradient ascent process, and/or (iii) via other methods.

By doing so, embodiments disclosed herein may reduce inference supply interruptions to inference consumers 102 by reducing inference model downtime and computing resources used for re-training poisoned AI models.

Inference consumers 102 may include any number of inference consumers (e.g., 102A, 102N). Inference consumers 102 may include businesses, individuals, or computers that may use the inference data to improve and/or automate decision-making. In the above example, the inference consumer may be law enforcement attempting to identify a person, and/or the inference consumer may offer computer-implemented services for businesses in order to determine which products may appeal to a potential customer.

While the example supplied is with respect to AI facial recognition, it will be appreciated that an AI model may be used to achieve other types of goals.

When performing its functionality, one or more of AI model manager 104, data sources 100, and inference consumers 102 may perform all, or a portion, of the methods and/or actions shown in FIGS. 2A-3C.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100 and inference consumers 102).

While illustrated in FIG. 1 as included a limited number of specific components, a system in accordance with an embodiment may include fewer, additional, and/or different components than those illustrated therein.

The system described in FIG. 1 may be used to reduce the computational cost for mitigating the impact of poisoned training data used train AI models. The following operations described in FIGS. 2A-2C may be performed by the system in FIG. 1 when providing this functionality.

FIG. 2A shows a data flow diagram in accordance with an embodiment. The data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume facial recognition services for images or video of an unidentified person. Facial recognition services may be provided by using AI models that have been trained to identify a person based on facial attributes.

As discussed with respect to FIG. 1, training data used for training AI models may be obtained from any number of data sources 100. Training data may be stored in training data repository 200. Training data repository 200 may include any number of training datasets (e.g., 200A, 200N).

Training data repository 200 may include data that defines an association between two pieces of information (e.g., which may be referred to as "labeled data"). For example, in the context of facial recognition, training data repository 200 may include images or video of a person who has already been identified by a user. The relationship between the images or video and the identification may be a portion of labeled data. Any of the training datasets (e.g., 200A) from training data repository 200 may relate the facial attributes of a person to their identifier (e.g., name, username, etc.) thereby including any number of portions of labeled data.

Data sources 100 may also provide ingest data 202. Ingest data 202 may be a portion of data for which an inference is desired to be obtained. Ingest data 202 may not be labeled data and, thus, an association for ingest data 202 may not be known. For example, returning to the facial recognition services example, ingest data 202 may include images of an unidentified person. Ingest data 202 may be used by AI model manager 104 to obtain the name of the unidentified person (e.g., through ingestion by an AI model).

AI model manager 104 may provide inferences for ingest data, such as ingest data 202. To do so, AI model manager 104 may include AI model 204 and training system 206. AI model 204 may be trained by training system 206 using a training dataset (e.g., training dataset 200A). For example, training system 206 may employ supervised learning using a training dataset that includes sample input data along with its desired output data (e.g., the pair being labeled data).

Once trained, trained AI model 208 may attempt to map the sample input data to the desired output data, as well as make inferences based on ingest data 202 that may differ from the sample data used to train trained AI model 208. In the context of the facial recognition services example, trained AI model 208 may be a trained facial recognition AI model, trained to map the facial attributes captured in images of a person to the name of the person.

To provide facial recognition services, AI model manager 104 may train any number of AI models which may generate inferences usable to identify persons in images. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to infer the identity of persons depicted in ingest data 202.

Once selected, ingest data 202 may be input to a trained AI model instance to generate an inference. AI model manager 104 may obtain the inference, which may be provided to inference consumers 102. In the facial recognition example, an image of an unidentified person may be input to the trained facial recognition AI model, the name of the unidentified person may be obtained by AI model manager 104, and the name of the unidentified person may be provided to an inference consumer such as a law enforcement agency.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212 and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, and/or information regarding the training datasets used to train the AI model instance.

Thus, as illustrated in FIG. 2A, the system of FIG. 1 may provide inferences using trained AI models. However, as noted above, if the trained AI models are poisoned then the trained AI models may no longer be trustworthy for inference generation. To manage inference generation when poisoned trained AI models are identified, the snapshots of snapshot database 212 may be used to computationally efficiently restore inference generation functionality, manage tainted inferences, and/or otherwise mitigate the impact of poisoned training data.

Figure 2B:
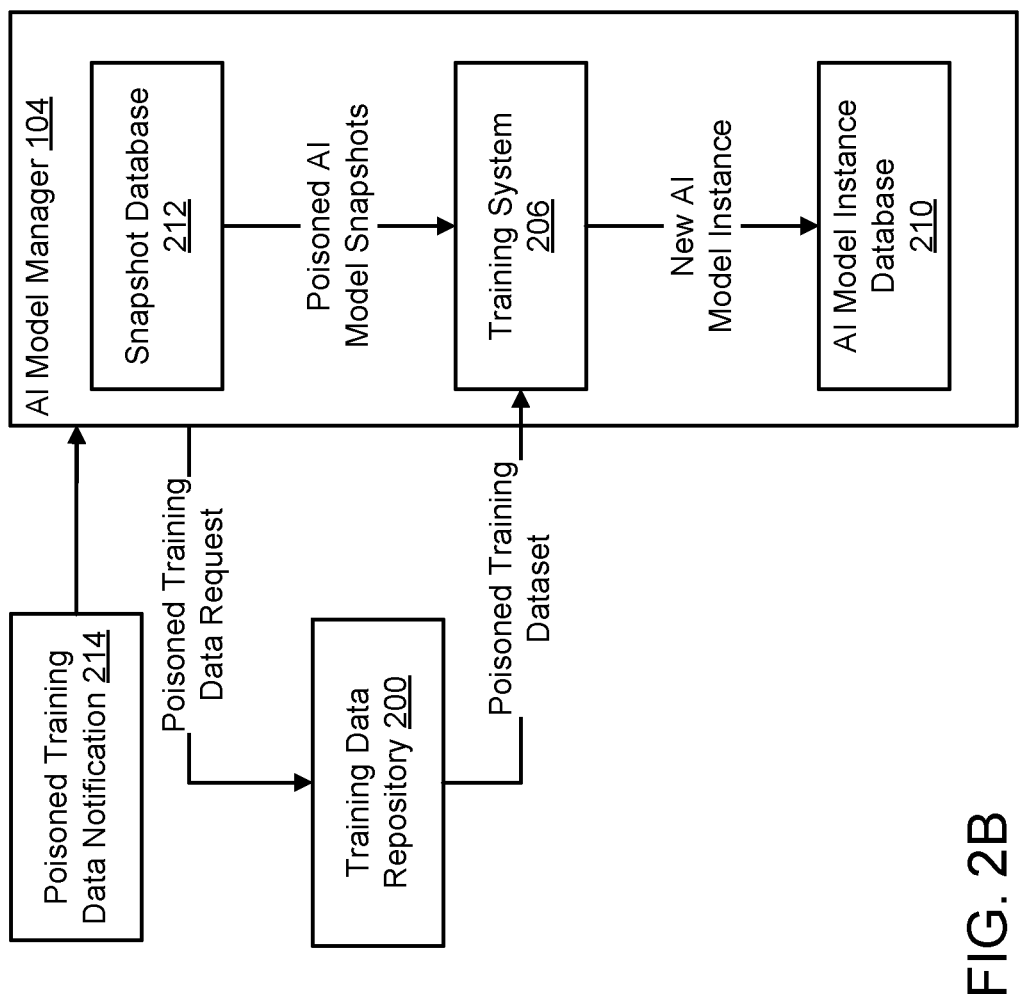
FIG. 2B shows a data flow diagram illustrating an AI model management system obtaining a new AI model in accordance with an embodiment.

Turning to FIG. 2B, in the event that a poisoned training dataset is identified, AI model manager 104 may obtain poisoned training data notification 214. Poisoned training data notification 214 may include information that identifies components associated with a trained AI model that are impacted by poisoned training data used to obtain the trained AI model.

The components may include (i) a poisoned portion of a training dataset, (ii) a tainted trained AI model instance associated with the poisoned portion of the training dataset, (iii) a poisoned inference associated with the tainted AI model instance, (iv) a time period associated with the poisoning (e.g., the time when the poisoned training data is introduced to the AI model, and/or the time the poisoning is remediated), and/or (v) a data source 100 that supplied the poisoned training data.

For example, in the context of facial recognition services, a poisoned portion of a training dataset may be an image of a person who has been incorrectly identified (e.g., incorrectly labeled). In this example, an incorrectly labeled image may be referred to as a "bad image." Training a facial recognition AI model using one or more bad images may result in a tainted facial recognition AI model that misclassifies ingested data (e.g., a picture displaying certain facial attributes) as being associated with persons that do not have the facial attributes and/or similar facial attributes included in the ingested data. The tainted facial recognition AI model may generate a poisoned inference that leads to an incorrect identification of a person depicted in a video.

Once the components are identified, AI model manager 104 may un-train the AI model to reduce the impact of poisoned training data on the AI model. To do so, AI model manager 104 may transmit poisoned training data request to training data repository 200. Poisoned training data request may include a request for transmission of any poisoned training data used to train the first poisoned instance of the AI model (if the poisoned training data is not included in the poisoned training data notification). Training data repository 200 may respond by transmitting poisoned training dataset to training system 206.

Training system 206 may also obtain poisoned AI model snapshots from snapshot database 212. The poisoned AI model snapshots may include: (i) a snapshot of the first poisoned instance of the AI model (e.g., the last instance of the AI model trained using poisoned training data), (ii) a snapshot of a second poisoned instance of the AI model, and (iii) snapshots of all subsequent poisoned AI model instances (e.g., instances of the AI model obtained via further training of the second poisoned instance of the AI model). The second poisoned instance of the AI model and all subsequent poisoned AI model instances may or may not have been trained using poisoned training data. The snapshots may be full snapshots (e.g., including structural information, weights, connections, etc.) or incremental snapshots. Incremental snapshots may include only differences (bidirectionally) of parameters that have changed between snapshots (e.g., including only the weights that have changed since the previous snapshot).

A last known good AI model instance (not shown) may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., retraining/updating may not remove the effect of the poisoned training data on the future operation of the trained AI model). The last known good AI model instance may be the last version of the AI model that is trained without using the poisoned training data for updating purposes.

Training system 206 may perform an un-training process to obtain a new AI model instance. For details regarding the un-training process, refer to FIG. 3C. The new AI model instance may be an instance of the AI model that reflects the most recent training data but poorly predicts all previously seen poisoned training data.

New AI model instance may be stored in AI model instance database 210 for inference generation purposes. If necessary, the new AI model instance may be used to generate replacement inferences usable by inference consumers 102 as described below.

Figure 2C:
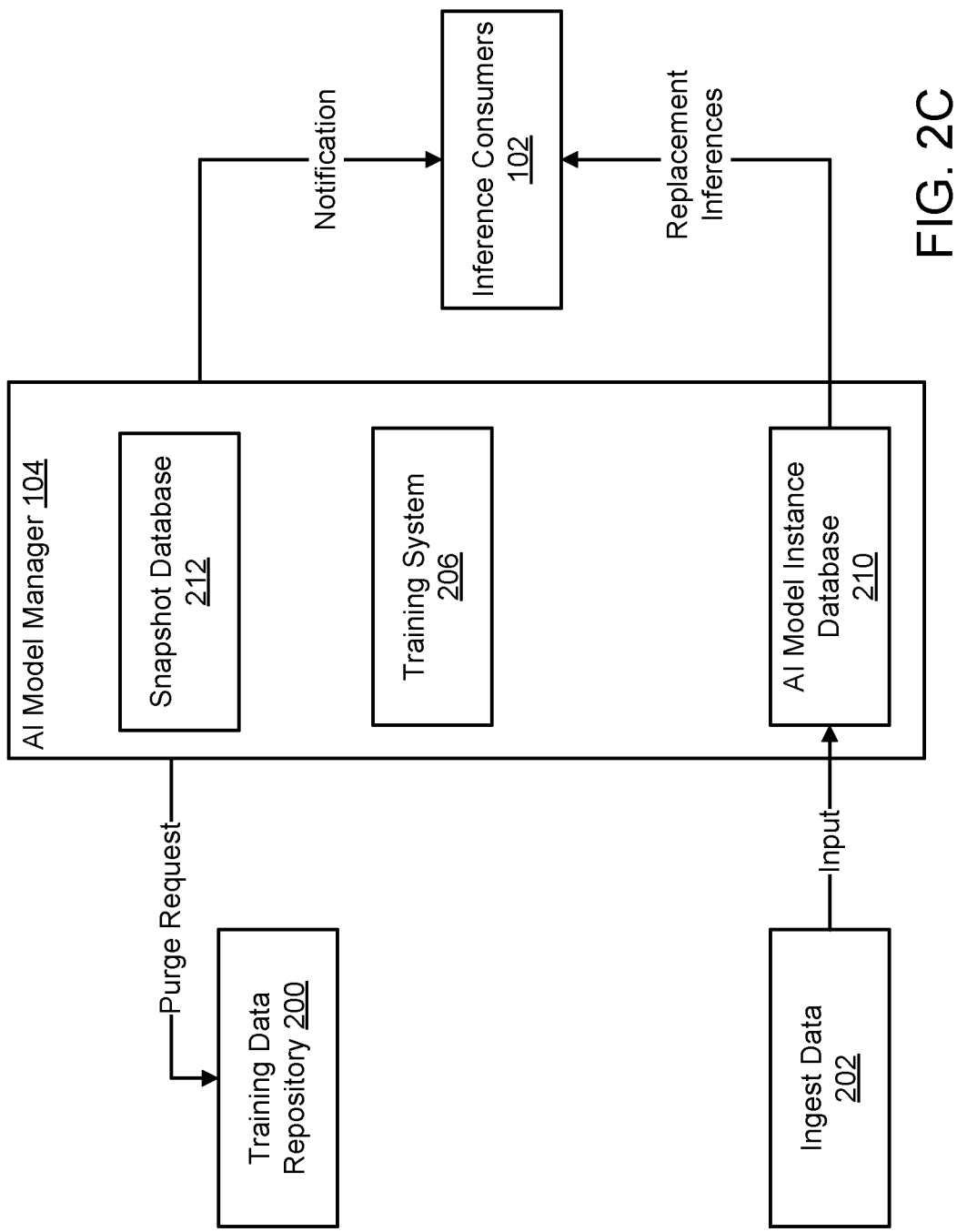
FIG. 2C shows a data flow diagram illustrating an AI model management system managing and remediating poisoned training data in accordance with an embodiment.

Turning to FIG. 2C, once the impact of the poisoned training data has been remediated, AI model manager 104 may (i) send a notification to inference consumers 102 regarding the poisoned inference, (ii) send a purge request to training data repository 200 regarding the poisoned portion of the training dataset, and/or (iii) generate replacement inferences usable by inference consumers 102 in place of previously obtained poisoned inferences.

The purge request may prompt the deletion of a poisoned portion of a training dataset from training data repository 200. Any number of poisoned portions of training data may be removed from training data repository 200 to create an updated training data repository (not shown). Updated training data repository may not include any portions of poisoned training data.

Like removal of the poisoned training data to reduce the impact of the poisoned training data on operation of the system, new AI model instance from AI model instance database 210 may be used to generate replacement inferences for any number of poisoned inferences (e.g., generated by the tainted trained AI model) by ingesting a portion of ingest data 202 (e.g., which may have been used to generate the poisoned inference). AI model manager 104 may then provide the replacement inferences to inference consumers 102 and/or otherwise use the replacement inference to reduce the impact of the poisoned inference.

For example, returning to the facial recognition services example, AI model manager 104 may send a notification to law enforcement (e.g., an inference consumer) regarding the incorrect identification of the person, and training data repository 200 may be updated by removing the one or more bad images. Consequently, an updated training data repository may be used to train a reverted facial recognition AI model (e.g., a last known good facial recognition AI model) without the impact of the poisoned training data. The reverted facial recognition AI model may be trained using only the portion of images and/or video from the updated training data repository that have not been previously used to update the reverted facial recognition AI model. Once trained, the untainted facial recognition AI model may ingest the video depicting the person and send an updated identification to law enforcement.

While a facial recognition service example is supplied to help describe FIGS. 2A-2C, it should be appreciated that the data flows illustrating AI model management in FIGS. 2A-2C may be used to achieve other types of goals without departing from embodiments disclosed herein.

Figure 3A:
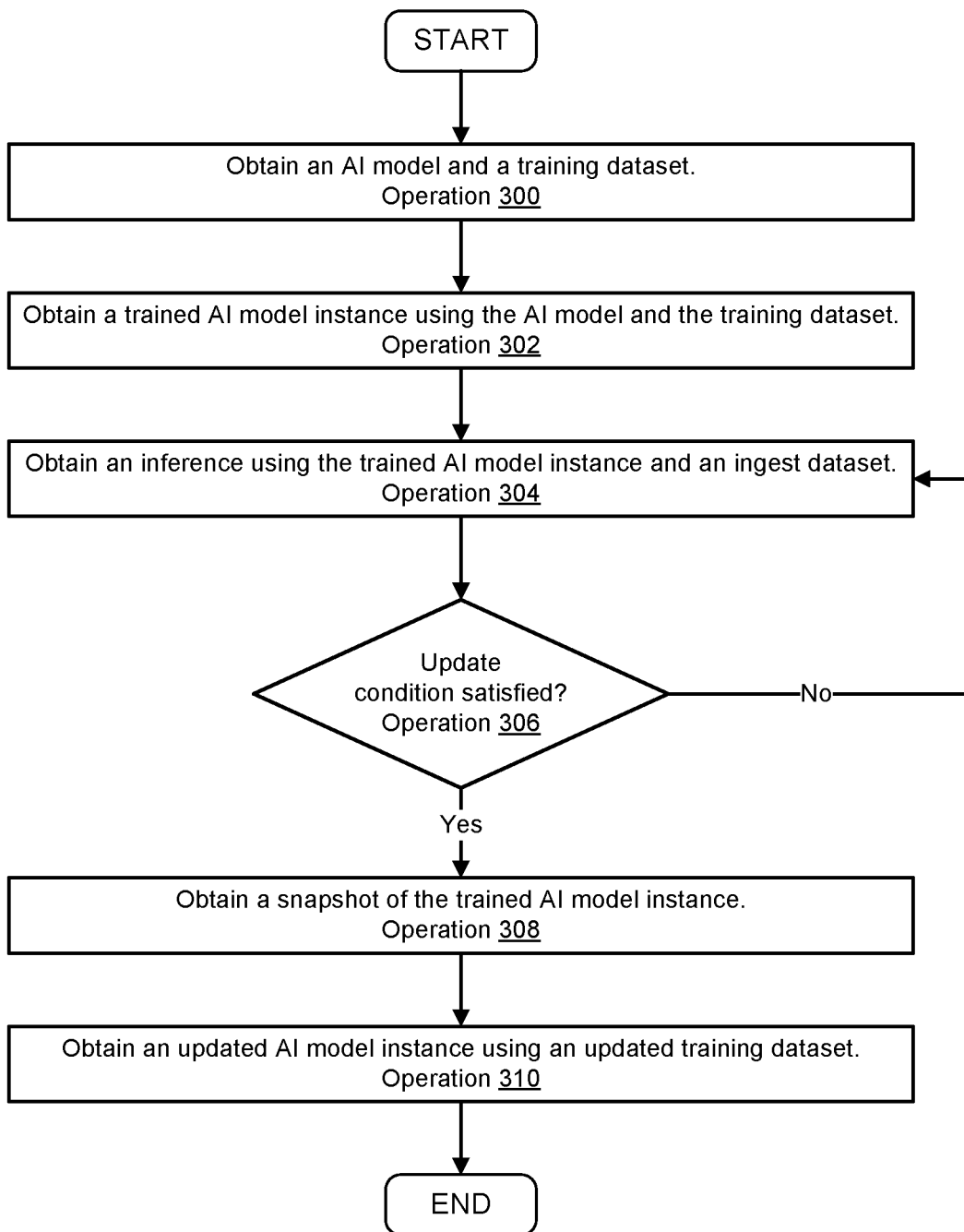
FIG. 3A shows a flow diagram illustrating a method of updating an AI model instance in accordance with an embodiment.
Figure 3B:
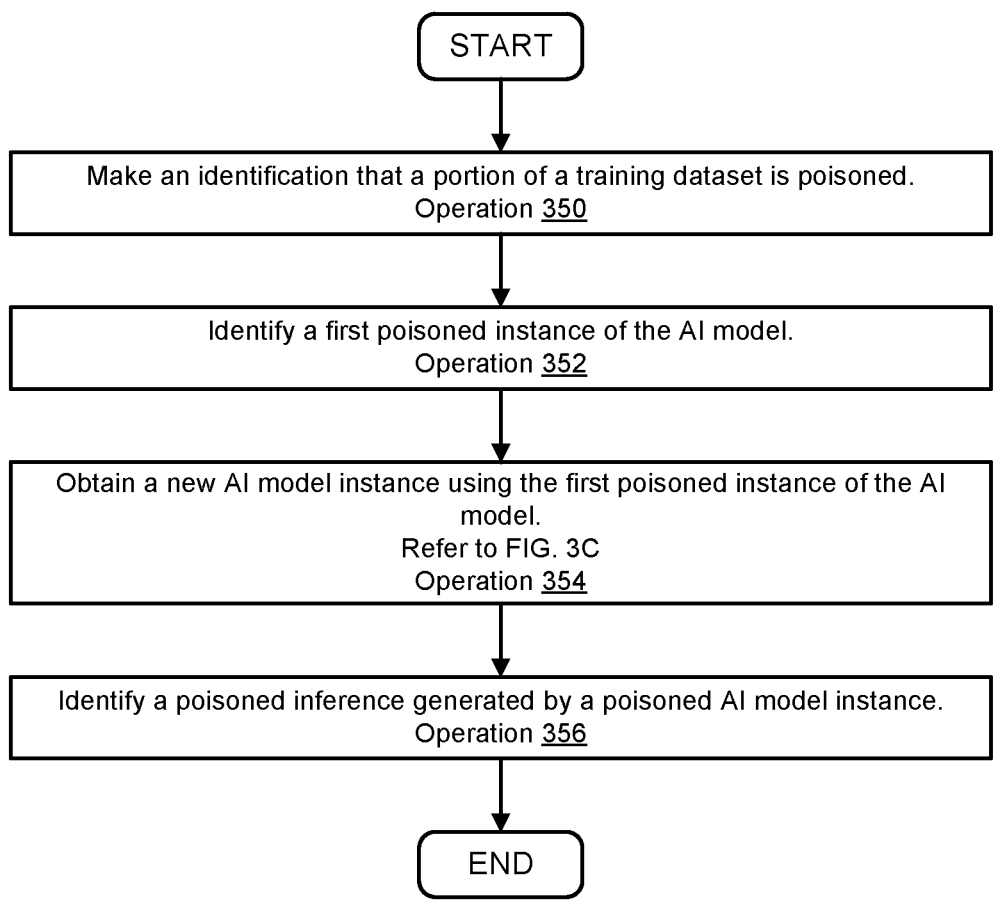
FIG. 3B shows a flow diagram illustrating a method of managing poisoned training data in accordance with an embodiment.
Figure 3C:
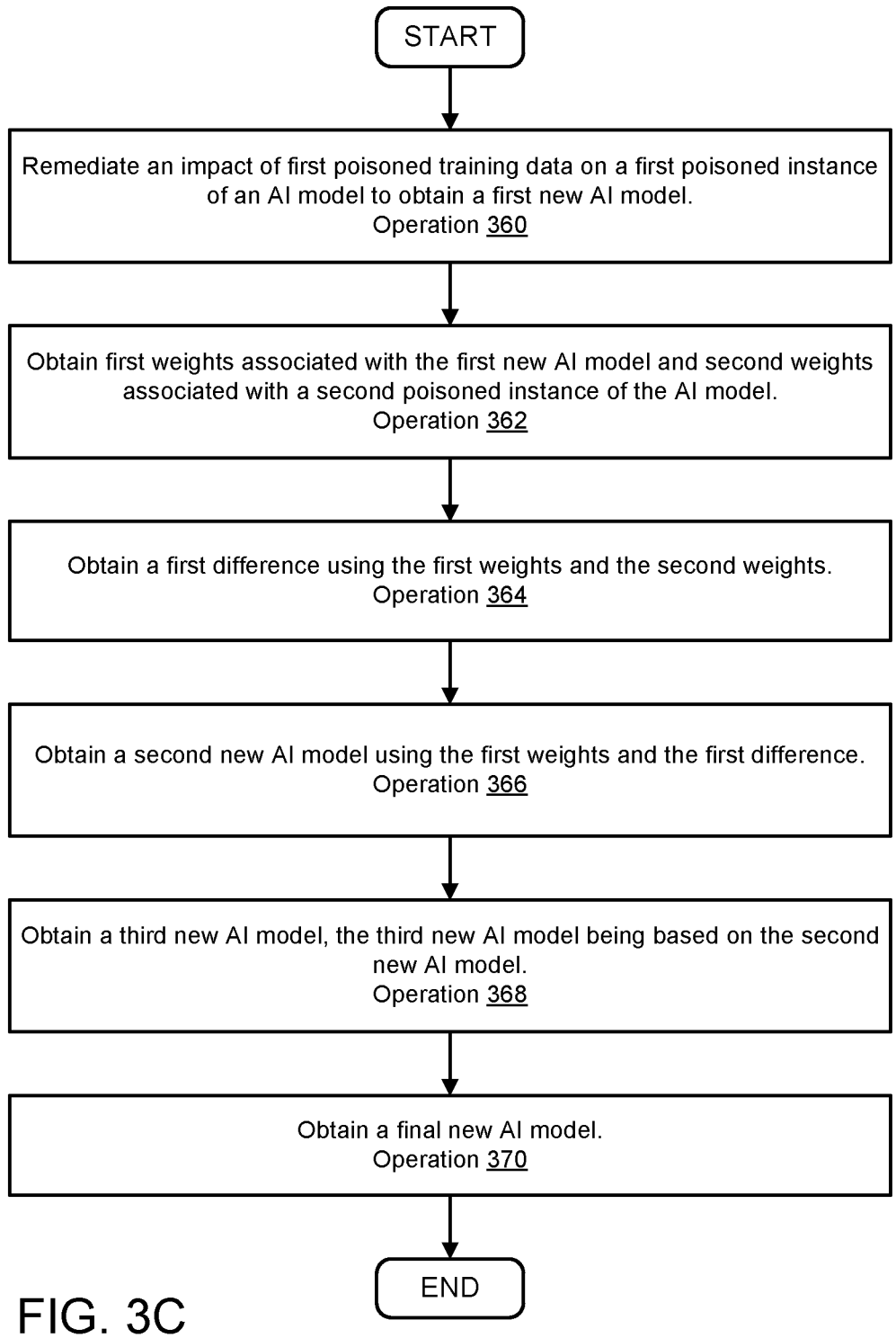
FIG. 3C shows a flow diagram illustrating a method of obtaining a new AI model in accordance with an embodiment.

As discussed above, the components of FIG. 1 may perform various methods to manage AI models. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a deep neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a multi-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data whose labels are linearly correlated with the selected features, and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data or unlabeled data. Training data included in the training dataset may be processed, cleansed and/or evaluated for quality in order to prepare the training dataset for use in training AI models.

At operation 302, a trained AI model instance may be obtained using the AI model and the training dataset. The trained AI model may be obtained by training the AI model to relate pieces of data (e.g., an input and an output) from the training dataset using a training system, such as the one in FIGS. 2A-2C. To do so, the training dataset and the AI model may be input to the training system.

The training system may employ machine learning techniques such as supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model management system which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data, and/or other characteristics to corresponding conditions that, if met, indicate that the update condition is satisfied.

For example, the update condition may be satisfied if (i) a sufficient amount of new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, and/or (iv) metadata identifying data sources from which training data has been collected.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a first element from a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing an identifier for an input used to obtain the inference, an identifier for the inference, identification information for the inference consumer, and/or a time stamp indicating when the inference was generated. Any number of snapshots of AI model instances may be stored in a snapshot database.

By storing the snapshot of an AI model instance, the snapshot may be used to (i) reduce the computational costs for reverting a poisoned AI model instance to a previous AI model instance that is un-poisoned (e.g., not trained using poisoned data), (ii) mitigate the effects of a poisoned inference provided to inference consumers, and/or (iii) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance is obtained using an updated training dataset. The updated AI model instance may be obtained by further training (e.g., updating) the trained AI model instance to relate pieces of data from an updated training dataset using a training system. The updated training dataset may include newly acquired training data (e.g., training data that has not already been used to train the trained AI model instance).

The training system may employ machine-learning methods such as incremental learning, which may allow an additional training step as new training data becomes available, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data.

The method may end following operation 310.

Turning to FIG. 3B, a flow diagram illustrating a method of managing poisoned training data in accordance with an embodiment is shown. The method may be performed by a data processing system, and/or another device.

At operation 350, an identification is made that a portion of a training dataset is poisoned. The identification may be made by (i) receiving the identification from another entity, (ii) reading the identification from storage, and/or (iv) generating the identification. The identification may be generated, for example, by performing various analysis of training data and/or operation of entities from which the training data may be obtained.

At operation 352, a first poisoned instance of the AI model is identified. The first poisoned instance of the AI model may be identified by identifying the first AI model instance trained using the poisoned training dataset. To do so, a snapshot of the first AI model instance trained using the poisoned training dataset may be located in a snapshot database. To identify the snapshot, metadata stored along with snapshots of the AI model in a snapshot database may be obtained. The metadata may include a record of the training data used to train each snapshot of the AI model and, therefore, may indicate which snapshot was trained using poisoned training data.

At operation 354, a new AI model instance is obtained using the first poisoned instance of the AI model. The obtained new AI model may be based, at least in part, on the first poisoned instance of the AI model and may be substantially free of an impact of the poisoned training data. However, to be entirely free of the impact of the poisoned training data, a new AI model may need to be entirely retrained using a significant quantity of training data (e.g., all of the training data obtained after the last known good instance of the AI model was obtained, but excluding the poisoned training data) which is computationally expensive. In contrast, the new AI model that is substantially free of the impact of the poisoned training data may be obtained using a much less computationally expensive process.

Refer to FIG. 3C for additional details regarding obtaining the new AI model instance that is substantially free of the impact of the poisoned training data.

At operation 356, a poisoned inference generated by a poisoned AI model instance is identified. The poisoned inference may be identified by accessing information stored in a snapshot of a tainted AI model instance. The snapshot of the tainted AI model instance may include associations (e.g., stored metadata) between the tainted AI model and any inference (e.g., a poisoned inference) generated by the tainted AI model. Once identified, the poisoned inference may be remediated.

The poisoned inference may be remediated by (i) notifying an inference consumer that consumed the poisoned inference, of the poisoned inference, (ii) obtaining a replacement inference (e.g., using the last known good instance of the AI model and the ingest dataset used to obtain the poisoned inference), (iii) providing the replacement inference to an inference consumer that consumed the poisoned inference, (iv) deleting the poisoned inference from an inference repository, and/or (v) retaining the un-poisoned inference.

The method may end following operation 356.

Turning to FIG. 3C, a flow diagram illustrating a method of obtaining a new AI model instance in accordance with an embodiment is shown. The operations shown in FIG. 3C may be an expansion of operation 354 in FIG. 3B. The method may be performed by AI model manager 104, data sources 100, inference consumers 102, and/or any other entity without departing from embodiments disclosed herein.

At operation 360, an impact of first poisoned training data on a first poisoned instance of the AI model is remediated to obtain a first new AI model. Remediating the impact of the first poisoned training data on the first poisoned instance of the AI model may include: (i) obtaining a snapshot of the first poisoned instance of the AI model, and (ii) performing an un-training process on the first poisoned instance of the AI model to obtain the first new AI model using the first poisoned training data.

The snapshot of the first poisoned instance of the AI model may be obtained using a method similar to that described in operation 308 of FIG. 3A with respect to a snapshot of the trained AI model instance.

In a first example, performing the un-training process may include: (i) obtaining contradictory training data, the contradictory training data including data values contradicting poisoned training data values in the first poisoned training data, and (ii) further training the new AI model using the contradictory training data. Because the quantity of the poisoned training data (and corresponding contradictory training data) may be much less than the total quantity of training data available for additional training, the computational cost for only training using the contradictory training data may be less than the computational cost for training using the total quantity of training data except for the poisoned training data. Thus, in this first example, the training process may be more computationally efficient than other training processes that may remove the impact of the first poisoned training data.

Contradictory training data may be obtained by: (i) obtaining the first poisoned training data, (ii) generating a contradictory data value for each poisoned data value of the first poisoned training data, and (iii) treating the contradictory data values as the contradictory training data. The contradictory training data may also be obtained by transmitting the first poisoned training data to another entity responsible for generating contradictory training data.

Further training the first poisoned instance of the AI model using the contradictory training data may include using the contradictory training data to train the first poisoned instance of the AI model. Weights of the first poisoned instance of the AI model may be modified during the further training process to, at least partially, remediate the impact of the poisoned training data on the AI model. Further training the first poisoned instance of the AI model using the contradictory training data may also include transmitting instructions to another entity responsible for further training the first poisoned instance of the AI model.

In a second example, performing the un-training process may include further training the first poisoned instance of the AI model using the first poisoned training data and an optimization process that modifies weights of the first poisoned instance of the AI model with an objective of poorly predicting the first poisoned training data. In contrast, the first poisoned instance of the AI model may have been obtained through further training of an un-poisoned instance of the AI model using, at least in part, the poisoned training data and an objective of faithfully predicting the first poisoned training data.

The optimization process may include performing a gradient ascent process to increase a loss function of the first poisoned instance of the AI model. Performing the gradient ascent process may include generating instructions for an algorithm to gradually increase the gradient of the loss function until the AI model no longer faithfully predicts poisoned training data. Performing the gradient ascent process may also include transmitting the first poisoned instance of the AI model to another entity responsible for performing gradient ascent to modify the weights and obtain the first new AI model. The first new AI model may be obtained via other methods without departing from embodiments disclosed herein.

At operation 362, first weights associated with the first new AI model and second weights associated with a second poisoned instance of the AI model are obtained. The first weights may be obtained by: (i) obtaining a snapshot of the new AI model, (ii) obtaining structural information of the first new AI model, and (iii) obtaining the weights associated with the first new AI model from the snapshot of the first new AI model using the structural information of the first new AI model.

The snapshot of the first new AI model may be obtained using a method similar to that described in operation 308 of FIG. 3A with respect to a snapshot of the trained AI model instance.

The structural information of the first new AI model may be stored along with the snapshot of the first new AI model and/or may be stored separately. If the structural information is stored along with the snapshot of the first new AI model, the structural information may be obtained along with the snapshot of the first new AI model. If the structural information is stored separately, the structural information may be obtained by requesting the structural information (and/or instructions for retrieving the structural information from a database) from the entity managing the structural information. The entity managing the structural information may retrieve the structural information from storage (locally or otherwise) and may transmit the structural information in response to the request. The entity managing the structural information may also transmit instructions for retrieval of the structural information from an AI model instance database (or any other database).

The weights associated with the first new AI model may be obtained using the structural information and the snapshot of the first new AI model. The snapshot of the first new AI model may include, for example, a full listing of the weights associated with each neuron in a neural network (e.g., described by the structural information). If the snapshot of the first new AI model includes the full listing of the weights, the weights may be obtained via the snapshot. However, in some cases, the snapshot of first new AI model may only include a limited listing of the weights that have been updated since a previous snapshot. If the snapshot of the first new AI model includes a limited listing of the weights, the structural information may be utilized to determine the number of neurons (and, therefore, the number of weights) in the neural network. Historical snapshots of the AI model may be obtained in order to fill in missing weights not included in the snapshot of the first new AI model. The weights associated with the first new AI model may be obtained via other methods without departing from embodiments described herein.

The second weights may be obtained using similar methods as those described above with relation to the first weights and a snapshot of the second poisoned instance of the AI model (e.g., an instance of the AI model obtained via further training of the first poisoned instance of the AI model).

At operation 364, a first difference is obtained using the first weights and the second weights. The first difference may be obtained by: (i) obtaining a first weight of the first weights, (ii) identifying a first weight of the second weights that corresponds to the first weight of the first weights, and (iii) obtaining a difference between the first weight of the first weights and the first weight of the second weights to obtain a portion of the first difference.

The first weight of the first weights may be obtained by obtaining a listing of the first weights and selecting the first weight of the first weights from the listing along with an identifier of the neuron associated with the first weight of the first weights. The first weight of the second weights may be identified by accessing a listing of the second weights and matching the identifier of the neuron associated with the first weight of the first weights to a neuron in the listing of the second weights. The weight of the second weights associated with the neuron may be treated as the first weight of the second weights. The difference between the first weight of the first weights and the first weight of the second weights may be obtained by subtracting the value of the first weight of the first weights from the value of the first weight of the second weights. The remainder of the first difference may be obtained by performing the steps described above for each weight of the first weights and each corresponding weight of the second weights.

The first difference may also be obtained by transmitting the first weights and the second weights to another entity responsible for generating the first difference and receiving the first difference in response to the transmission of the first weights and the second weights.

At operation 366, a second new AI model is obtained using the first weights and the first difference. The second new AI model may be obtained by: (i) adding the first difference to the first weights to obtain new weights and (ii) using the new weights as weights for the second new AI model. The first difference may be added to the first weights by: (i) identifying a first difference of the first difference associated with a neuron of the neural network, (ii) identifying a first weight of the first weights corresponding to the first difference of the first difference, (iii) adding the first difference of the first difference to the first weight of the first weights, and (iv) repeating this addition process for each difference of the first difference and each corresponding weight of the first weights.

At operation 368, a third new AI model is obtained. The third new AI model may be based on the second new AI model. Obtaining the third new AI model may include: (i) determining whether the second poisoned instance of the AI model was trained using, at least in part, second poisoned training data, (ii) if the second poisoned instance of the AI model was trained using, at least in part, second poisoned training data, remediating an impact of the second poisoned training data on the second new AI model to obtain a third new AI model, and (iii) if the second poisoned instance of the AI model was not trained using, at least in part, second poisoned training data, treating the second new AI model as the third new AI model. The third new AI model may be treated as a replacement for the second poisoned instance of the AI model.

To determine whether the second poisoned instance of the AI model was trained using, at least in part, second training data, a snapshot of the second poisoned instance of the AI model may be obtained from a snapshot database. The snapshot of the second poisoned instance of the AI model may include metadata indicating the data used for training the second poisoned instance of the AI model. The data used for training the second poisoned instance of the AI model may be evaluated to determine whether the data used for training the second poisoned instance of the AI model is second poisoned training data. A listing of poisoned training data values may be identified and/or obtained from another entity. If at least a portion of the data values used for training the second poisoned instance of the AI model correspond to data values in the listing, the training data may be identified as the second poisoned training data.

The impact of the second poisoned training data on the second new AI model may be remediated using a process similar to that described in operation 360 with relation to remediating the impact of the first poisoned training data on the first poisoned instance of the AI model.

At operation 370, a final new AI model is obtained. In a first example of obtaining the final new AI model, the second poisoned instance of the AI model may be the most recent instance of the AI model. In this first example, the third new AI model may be the final new AI model.

In a second example of obtaining the final new AI model, a third poisoned instance of the AI model may have been previously obtained through further training of the second poisoned instance of the AI model using, at least in part, third poisoned training data. In this second example, the third poisoned training data used to train the third poisoned instance of the AI model may be remediated by: (i) obtaining a snapshot of the third poisoned instance of the AI model and a snapshot of the third new AI model, (ii) obtaining third weights associated with the third poisoned instance of the AI model and fourth weights associated with the third new AI model, (iii) obtaining a second difference using the third weights and the fourth weights, (iii) obtaining a fourth new AI model using the fourth weights and the second difference, and (iv) remediating an impact of the third poisoned training data on the fourth new AI model to obtain a fifth new AI model.

The snapshot of the third poisoned instance of the AI model and the snapshot of the third new AI model may be obtained using a process similar to that described in operation 360 with relation to obtaining the snapshot of the first poisoned instance of the AI model.

The third weights may be obtained using a process similar to that described in operation 362 with relation to obtaining the first weights and the second weights.

The second difference may be obtained using a processing similar to that described in operation 364 with relation to obtaining the first difference.

The fourth new AI model may be obtained using a process similar to that described in operation 366 with relation to obtaining the second new AI model.

The impact of the third poisoned training data on the fourth new AI model may be performed using a process similar to that described in operation 360 with relation to remediating the impact of the first poisoned training data.

The fifth new AI model may be treated as a replacement for the third poisoned instance of the AI model and, therefore, the final new AI model.

In a third example of obtaining the final new AI model, a third poisoned instance of the AI model may have been previously obtained through further training of the second poisoned instance of the AI model using, at least in part, third un-poisoned training data. In this third example, the third new AI model may be updated to reflect the additional un-poisoned training data but may not require un-training. The third new AI model may be updated to reflect the additional un-poisoned training data by: (i) obtaining third weights associated with the third poisoned instance of the AI model and fourth weights associated with the third new AI model, (ii) obtaining a second difference using the third weights and the fourth weights, and (iii) obtaining a fourth new AI model using weights of the third new AI model and the second difference.

The third weights may be obtained using a process similar to that described in operation 362 with relation to obtaining the first weights and the second weights.

The second difference may be obtained using a processing similar to that described in operation 364 with relation to obtaining the first difference.

The fourth new AI model may be obtained using a process similar to that described in operation 366 with relation to obtaining the second new AI model. The fourth new AI model may be treated as a replacement for the third poisoned instance of the AI model and, therefore, the final new AI model.

The operations in the second example may be repeated for any additional poisoned instances of the AI model trained using, at least in part, additional poisoned training data. The operations in the third example may be repeated for any additional poisoned instances of the AI model trained using, at least in part, additional un-poisoned training data. The final new AI model may be obtained following performance of the operations in the second or third example until all poisoned training data has been remediated throughout the instances of the AI model. The method may end following operation 370.

Figure 4:
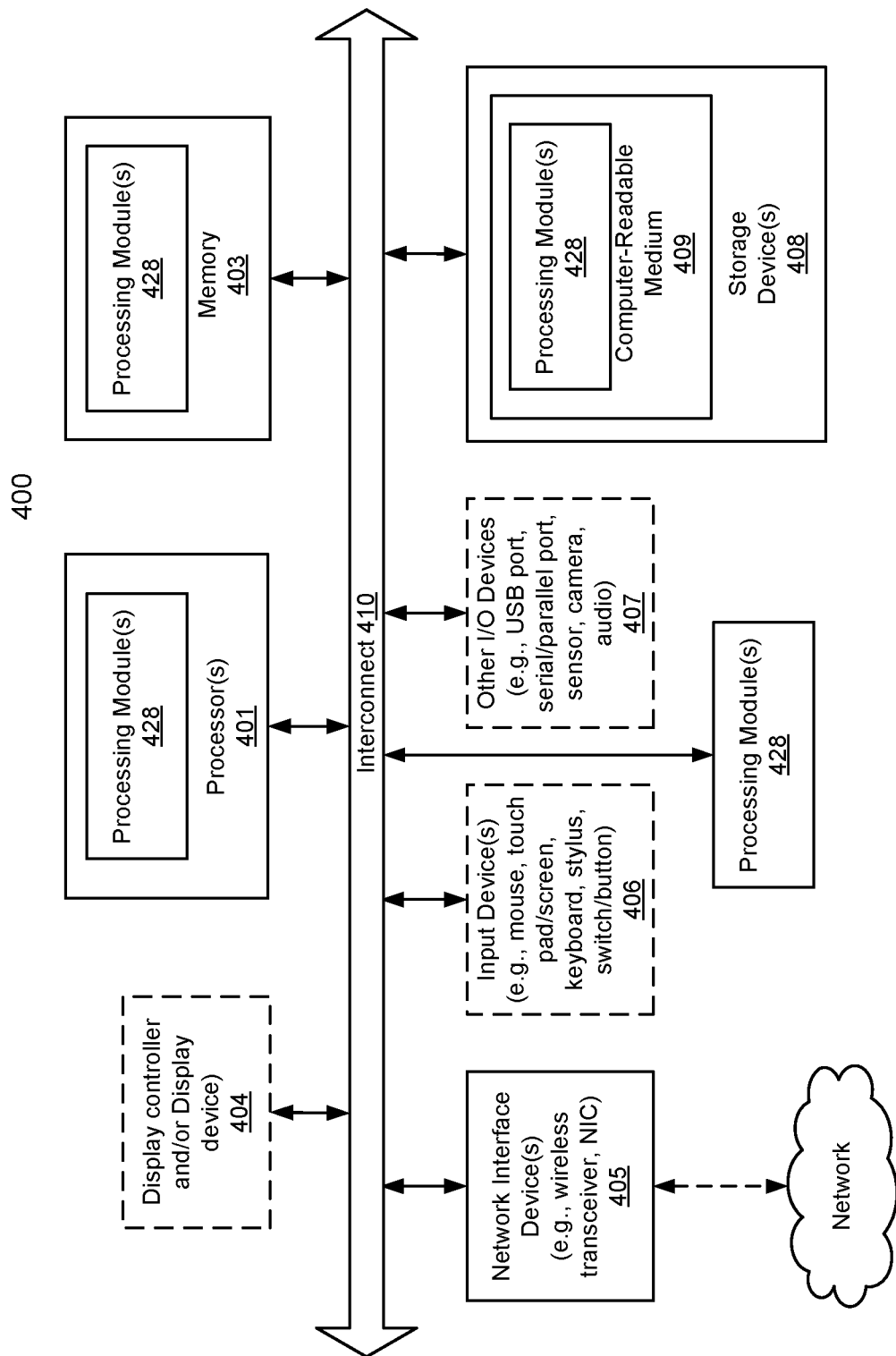
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an artificial intelligence (AI) model, the method comprising:
    obtaining a snapshot of a first poisoned instance of the AI model, the first poisoned instance of the AI model being obtained using, at least in part, first poisoned training data;
    remediating an impact of the first poisoned training data on the first poisoned instance of the AI model to obtain a first new AI model;
    obtaining a snapshot of the first new AI model;
    obtaining a snapshot of a second poisoned instance of the AI model, the second poisoned instance of the AI model being obtained through further training of the first poisoned instance of the AI model;
    obtaining first weights associated with the new AI model using the snapshot of the new AI model;
    obtaining second weights associated with the second poisoned instance of the AI model using the snapshot of the second poisoned instance of the AI model;
    obtaining a first difference using the first weights and the second weights; and
    obtaining a second new AI model using the first weights and the first difference.

2. The method of claim 1, further comprising:
    making a determination regarding whether the second poisoned instance of the AI model was trained using, at least in part, second poisoned training data; and
    in a first instance of the determination in which the second poisoned instance of the AI model was trained using, at least in part, second poisoned training data:
        remediating an impact of the second poisoned training data on the second new AI model to obtain a third new AI model, the third new AI model being treated as a replacement for the second poisoned instance of the AI model; and
    in a second instance of the determination in which the second poisoned instance of the AI model was not trained using, at least in part, second poisoned training data:
        treating the second new AI model as the third new AI model.

3. The method of claim 2, further comprising:
    obtaining a snapshot of a third poisoned instance of the AI model, the third poisoned instance of the AI model being obtained through further training of the second poisoned instance of the AI model using, at least in part, third poisoned training data;
    obtaining a snapshot of the third new AI model;
    obtaining third weights associated with the third poisoned instance of the AI model using the snapshot of the third poisoned instance of the AI model;
    obtaining fourth weights associated with the third new AI model using the snapshot of the third new AI model;
    obtaining a second difference using the third weights and the fourth weights;
    obtaining a fourth new AI model using the fourth weights and the second difference; and
    remediating an impact of the third poisoned training data on the fourth new AI model to obtain a fifth new AI model, the fifth new AI model being treated as a replacement for the third poisoned instance of the AI model.

4. The method of claim 2, further comprising:
    obtaining a snapshot of a third poisoned instance of the AI model, the third poisoned instance of the AI model being obtained through further training of the second poisoned instance of the AI model using, at least in part, additional un-poisoned training data;
    obtaining a snapshot of the third new AI model;
    obtaining third weights associated with the third poisoned instance of the AI model using the snapshot of the third poisoned instance of the AI model;
    obtaining fourth weights associated with the third new AI model using the snapshot of the third new AI model;
    obtaining a second difference using the third weights and the fourth weights;
    obtaining a fourth new AI model using the fourth weights and the second difference, the fourth new AI model being treated as a replacement for the third poisoned instance of the AI model.

5. The method of claim 1, wherein the first poisoned instance of the AI model is also obtained, at least in part, using additional un-poisoned training data.

6. The method of claim 1, wherein obtaining the first weights comprises:
    obtaining the snapshot of the first new AI model;
    obtaining structural information of the first new AI model; and
    obtaining the first weights from the snapshot of the first new AI model using the structural information of the first new AI model.

7. The method of claim 6, wherein obtaining the first difference comprises:
    identifying a first weight of the first weights;
    identifying a first weight of the second weights that corresponds to the first weight of the first weights; and
    obtaining a difference between the first weight of the first weights and the first weight of the second weights to obtain a portion of the first difference.

8. The method of claim 1, wherein remediating the impact of the first poisoned training data on the first poisoned instance of the AI model comprises:
    performing an un-training process on the first poisoned instance of the AI model to obtain the first new AI model using the first poisoned training data.

9. The method of claim 8, wherein performing the un-training process comprises:
- obtaining contradictory training data, the contradictory training data comprising data values contradicting poisoned data values in the first poisoned training data; and
- further training the first poisoned instance of the AI model using the contradictory training data.

10. The method of claim 8, wherein performing the un-training process comprises:
- further training the first poisoned instance of the AI model using the first poisoned training data and an optimization process that modifies weights of the first poisoned instance of the AI model with an objective of poorly predicting the first poisoned training data,
- wherein the first poisoned instance of the AI model having been obtained through further training of an un-poisoned instance of the AI model using, at least in part, the poisoned training data and an objective of faithfully predicting the first poisoned training data.

11. The method of claim 10, wherein the further training of the first poisoned instance of the AI model comprises:
- performing a gradient ascent process to increase a loss function of the first poisoned instance of the AI model.

12. A non-transitory machine-readable medium having instructions stored therein, which when executed by a processor, cause the processor to perform operations for managing an artificial intelligence (AI) model, the operations comprising:
- obtaining a snapshot of a first poisoned instance of the AI model, the first poisoned instance of the AI model being obtained using, at least in part, first poisoned training data;
- remediating an impact of the first poisoned training data on the first poisoned instance of the AI model to obtain a first new AI model;
- obtaining a snapshot of the first new AI model;
- obtaining a snapshot of a second poisoned instance of the AI model, the second poisoned instance of the AI model being obtained through further training of the first poisoned instance of the AI model;
- obtaining first weights associated with the new AI model using the snapshot of the new AI model;
- obtaining second weights associated with the second poisoned instance of the AI model using the snapshot of the second poisoned instance of the AI model;
- obtaining a first difference using the first weights and the second weights; and
- obtaining a second new AI model using the first weights and the first difference.

13. The non-transitory machine-readable medium of claim 12, further comprising:
- making a determination regarding whether the second poisoned instance of the AI model was trained using, at least in part, second poisoned training data; and
- in a first instance of the determination in which the second poisoned instance of the AI model was trained using, at least in part, second poisoned training data:
  - remediating an impact of the second poisoned training data on the second new AI model to obtain a third new AI model, the third new AI model being treated as a replacement for the second poisoned instance of the AI model; and
- in a second instance of the determination in which the second poisoned instance of the AI model was not trained using, at least in part, second poisoned training data:
  - treating the second new AI model as the third new AI model.

14. The non-transitory machine-readable medium of claim 13, further comprising:
- obtaining a snapshot of a third poisoned instance of the AI model, the third poisoned instance of the AI model being obtained through further training of the second poisoned instance of the AI model using, at least in part, third poisoned training data;
- obtaining a snapshot of the third new AI model;
- obtaining third weights associated with the third poisoned instance of the AI model using the snapshot of the third poisoned instance of the AI model;
- obtaining fourth weights associated with the third new AI model using the snapshot of the third new AI model;
- obtaining a second difference using the third weights and the fourth weights;
- obtaining a fourth new AI model using the fourth weights and the second difference; and
- remediating an impact of the third poisoned training data on the fourth new AI model to obtain a fifth new AI model, the fifth new AI model being treated as a replacement for the third poisoned instance of the AI model.

15. The non-transitory machine-readable medium of claim 13, further comprising:
- obtaining a snapshot of a third poisoned instance of the AI model, the third poisoned instance of the AI model being obtained through further training of the second poisoned instance of the AI model using, at least in part, additional un-poisoned training data;
- obtaining a snapshot of the third new AI model;
- obtaining third weights associated with the third poisoned instance of the AI model using the snapshot of the third poisoned instance of the AI model;
- obtaining fourth weights associated with the third new AI model using the snapshot of the third new AI model;
- obtaining a second difference using the third weights and the fourth weights;
- obtaining a fourth new AI model using the fourth weights and the second difference, the fourth new AI model being treated as a replacement for the third poisoned instance of the AI model.

16. The non-transitory machine-readable medium of claim 12, wherein the first poisoned instance of the AI model is also obtained, at least in part, using additional un-poisoned training data.

17. A data processing system, comprising:
- a processor; and
- a memory coupled to the processor to store instructions, which when executed by the processor, cause the processor to perform operations for managing an artificial intelligence (AI) model, the operations comprising:
  - obtaining a snapshot of a first poisoned instance of the AI model, the first poisoned instance of the AI model being obtained using, at least in part, first poisoned training data;
  - remediating an impact of the first poisoned training data on the first poisoned instance of the AI model to obtain a first new AI model;
  - obtaining a snapshot of the first new AI model;
  - obtaining a snapshot of a second poisoned instance of the AI model, the second poisoned instance of the AI model being obtained through further training of the first poisoned instance of the AI model;

obtaining first weights associated with the new AI model using the snapshot of the new AI model;
obtaining second weights associated with the second poisoned instance of the AI model using the snapshot of the second poisoned instance of the AI model;
obtaining a first difference using the first weights and the second weights; and
obtaining a second new AI model using the first weights and the first difference.

18. The data processing system of claim 17, further comprising:
making a determination regarding whether the second poisoned instance of the AI model was trained using, at least in part, second poisoned training data; and
in a first instance of the determination in which the second poisoned instance of the AI model was trained using, at least in part, second poisoned training data:
remediating an impact of the second poisoned training data on the second new AI model to obtain a third new AI model, the third new AI model being treated as a replacement for the second poisoned instance of the AI model; and
in a second instance of the determination in which the second poisoned instance of the AI model was not trained using, at least in part, second poisoned training data:
treating the second new AI model as the third new AI model.

19. The data processing system of claim 18, further comprising:
obtaining a snapshot of a third poisoned instance of the AI model, the third poisoned instance of the AI model being obtained through further training of the second poisoned instance of the AI model using, at least in part, third poisoned training data;
obtaining a snapshot of the third new AI model;
obtaining third weights associated with the third poisoned instance of the AI model using the snapshot of the third poisoned instance of the AI model;
obtaining fourth weights associated with the third new AI model using the snapshot of the third new AI model;
obtaining a second difference using the third weights and the fourth weights;
obtaining a fourth new AI model using the fourth weights and the second difference; and
remediating an impact of the third poisoned training data on the fourth new AI model to obtain a fifth new AI model, the fifth new AI model being treated as a replacement for the third poisoned instance of the AI model.

20. The data processing system of claim 18, further comprising:
obtaining a snapshot of a third poisoned instance of the AI model, the third poisoned instance of the AI model being obtained through further training of the second poisoned instance of the AI model using, at least in part, additional un-poisoned training data;
obtaining a snapshot of the third new AI model;
obtaining third weights associated with the third poisoned instance of the AI model using the snapshot of the third poisoned instance of the AI model;
obtaining fourth weights associated with the third new AI model using the snapshot of the third new AI model;
obtaining a second difference using the third weights and the fourth weights;
obtaining a fourth new AI model using the fourth weights and the second difference, the fourth new AI model being treated as a replacement for the third poisoned instance of the AI model.

* * * * *